INVENTORS
ROBERT H. HABERMEHL
& KENTON A. ATWOOD
BY

THEIR ATTORNEY

United States Patent Office

3,387,942
Patented June 11, 1968

3,387,942
PRODUCTION OF HYDROGEN
Robert H. Habermehl, Louisville, Ky., and Kenton A. Atwood, New Albany, Ind., assignors to Catalysts & Chemicals Inc., Louisville, Ky., a corporation of Delaware
Filed May 10, 1965, Ser. No. 454,346
3 Claims. (Cl. 23—213)

ABSTRACT OF THE DISCLOSURE

In the production of hydrogen a gaseous hydrocarbon is reacted with steam in a reforming stage. The reformed gases are then treated with additional steam using a different catalyst to convert the carbon monoxide to carbon dioxide and still more hydrogen. Prior art processes have always been concerned with maximum reforming and maximum carbon monoxide or shift conversion. The shift conversion and reforming parameters are differently related herein.

---

This invention pertains to the production of hydrogen.

Several years ago there was introduced into the petroleum industry a process involving hydrotreating various petroleum stocks for the removal of sulfur. Hydrotreating has recently been extended and covers the removal of nitrogen as well. Hydrocracking has also assumed a place of importance in petroleum refining. Originally refineries used by-product hydrogen for hydrotreating processes. However, since their introduction, the number of hydrotreating processes has rapidly increased. In addition processes have been developed for hydrogenating lubricating oils. Such being the case, refineries have found that they have insufficient hydrogen, and have begun to install hydrogen plants to produce additional hydrogen. For the most part these plants have been conventional steam-gas reforming plants. Because of hydrogen requirements such plants usually are quite large, having a capacity of 25 million to 70 million standard cubic feet per day (MM s.c.f.d.). This invention relates to improvements in the conventional reforming process generally employed in gas reforming plants.

In the process for the production of hydrogen by steam-gas reforming, a gaseous saturated hydrocarbon such as methane, after being passed over an absorbing material such as activated carbon to remove sulfur, is reformed with steam to yield synthesis gas. Synthesis gas is a stream containing carbon monoxide and hydrogen in combination with minor amounts of other exit gases leaving a steam-gas reforming furnace. The furnace usually contains a nickel catalyst. In this process for the production of hydrogen, the synthesis gas is treated with additional steam in the presence of a different catalyst to convert carbon monoxide to carbon dioxide and still more hydrogen. This reaction, termed the water-gas shift conversion, requires the greatest quantity of catalyst used in hydrogen production. Following the water-gas shift reaction the gas stream is passed through a carbon dioxide scrubber in order to remove substantially all of the carbon dioxide. After carbon dioxide removal it is necessary to convert any remaining carbon monoxide into methane. This methanation is brought about by reduction using a nickel on alumina or kieselguhr catalyst.

The reforming process can perhaps be better understood by reference to the accompanying drawing.

Figure 1:
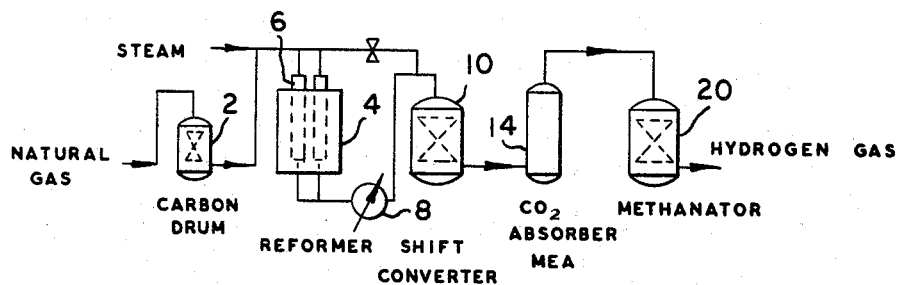
FIG. 1 is a simplified flow diagram of a gas reforming process to which this invention applies.

In the drawing, pumps, gauges, valves and the like have been omitted for simplicity. The feed gas stream is first desulfurized in drum 2. The gas reforming of gaseous saturated hydrocarbons involves a method of maintaining the catalyst at sufficiently high temperature by means of an external heat source so that the gases are heated to temperatures between 1200° F. and 2000° F. during the reforming reaction. Generally temperatures, inside tube, are between 1400° F. and 1600° F. These conditions are produced in a furnace 4 adapted to be fired with oil or gas. The hydrocarbon and steam are passed through a manifold and the mixture is distributed among, and passed through, a series of parallel tubes 6 which are filled with the reforming catalyst. The hydrocarbon-steam mixture is passed through reactor tubes 6 at space velocities of 400 to 600, generally 500, space velocity being defined as the volume of gas flowing under standard conditions of temperature and pressure per unit volume of catalyst per hour. Pressures on the other hand range from 30 to 3000 p.s.i.g., atmospheric to 700 p.s.i.g. generally being used.

Referring specifically to FIG. 1, the gases issuing from reformer 4, or exit gases (on a dry basis), usually contain a major percentage of hydrogen and lesser quantities of methane, carbon monoxide and carbon dioxide. This exit gas stream is cooled at 8 and conducted to a conventional shift converter 10 where the carbon monoxide in the stream, by reaction with additional steam, is converted to hydrogen and carbon dioxide. The stream issuing from the shift converter generally contains hydrogen and carbon dioxide along with 1 to 2 percent methane, and 1 to 2 percent carbon monoxide. By carbon dioxide scrubbing in absorber 14 the carbon dioxide is virtually eliminated. Carbon monoxide—and any carbon dioxide—is converted in reactor 20 to methane by reaction with hydrogen. A gas containing from about 94 percent to 99 percent hydrogen is withdrawn from methanator 20. The ratio of steam to hydrogen in the feed gas is generally about 2 to 10 mols of steam per mol of methane, or per carbon atom in other hydrocarbons, depending on the percent conversion to be obtained.

It can be seen that the purity of a hydrogen stream depends on reformer methane leakage, and on shift converter carbon monoxide leakage. By methane or carbon monoxide leakage is meant the methane or carbon monoxide in the stream which is not converted in the particular conversion process. Stated differently, the carbon dioxide is removed from the system by scrubbing. Since methane leaking from the reforming reaction, and methane formed from carbon monoxide during methanation are present in the hydrogen gas stream, only methane leakage and carbon monoxide leakage, apart from inert gases, need to be considered as affecting the purity of a hydrogen gas stream. This invention is concerned with the relationship of these two parameters. The invention relates these parameters by the use of a low temperature shift catalyst.

Heretofore in the production of hydrogen, maximum shift conversion has been in balance with maximum reforming. Thus, the reforming process has been operated under reforming equilibrium conditions minimizing methane leakage, and the shift conversion process has been conducted to minimize carbon monoxide leakage, making a hydrogen stream of maximum purity. Prior art processes have been concerned with reformer operation resulting in lowering the unconverted methane in the reformer as low as possible prior to shift conversion. By the practice of this invention the reforming and shift conversion parameters are differently related. The invention involves (a) minimizing the carbon monoxide content of the shifted effluent and (b) augmenting the methane content of the reformer effluent, parameters (a) and (b)

being so related that the total methane in the methanated product stream is two to ten percent, this relation resulting in a reduction of stream, reformer tubes, fuel, and various combinations of these.

This invention thus involves a process leading away from prior methods. By virtue of a low temperature shift process, operation of the reformer is such that the reformed gas stream produced contains more methane than is usual for the process. Low temperature shift catalysts are disclosed in U.S. 3,303,001, issued Feb. 7, 1967. Those disclosed therein are copper oxide-zinc oxide shift catalysts containing zinc oxide and copper as active ingredients after reduction, in a weight ratio based on metal of 0.5 to 3 zinc to 1 copper. These catalysts are prepared by co-precipitating copper and zinc as their carbonates from an aqueous solution of their soluble salts through double decomposition reaction with sodium carbonate. Sodium salts are removed so that the level of sodium, calculated from sodium oxide after calcining to the oxides, is less than 0.2 percent. The sodium carbonate-containing copper and zinc carbonate percipitate is then calcined to form the oxides.

Referring again to the drawing, for most hydrogenation processes it is not generally essential that hydrogen used have a high purity. Plants are being built to produce hydrogen with a purity above around 90 percent, usually about 94 to 98 percent, the remainder being methane. In a conventional plant such as is shown in FIG. 1 methane leakage from reformer 4 is two to three percent, and carbon monoxide leakage from converter 10 is one to three percent. By this invention a low temperature shift catalyst in shift converter 10 reduces carbon monoxide to less than one percent. The converter is operated at a temperature below 600° F., preferably 350° F. to 500° F. instead of the usual 650° F. to 800° F. The low temperature shift converter steam to gas ratio is 0.4:1 to 2:1. The methane and steam in reformer 4 are consequently reacted under more moderate reforming equilibrium conditions, that is at equilibrium conditions resulting in a higher methane content in the reformer effluent. The parameters are thus so related that the total hydrogen in the methanated product stream is 90 to 98 percent. The purity of a hydrogen gas stream in the gas reforming process described hereinbefore is affected equally by both parameters. Therefore, for a given purity, say 94 percent, the degree of conversion of the carbon monoxide which can be effected will determine how much methane can be allowed to leak through the reformer. The invention involves an intentional augmentation of one of the two parameters, that of reformer methane leakage, determining hydrogen purity. This alteration can take any of several forms, such as a reduction in steam, a reduction in fuel, a reduction in the number of tubes utilized in the reformer, reduction in hydrocarbon feed, or several of these.

Figure 2:
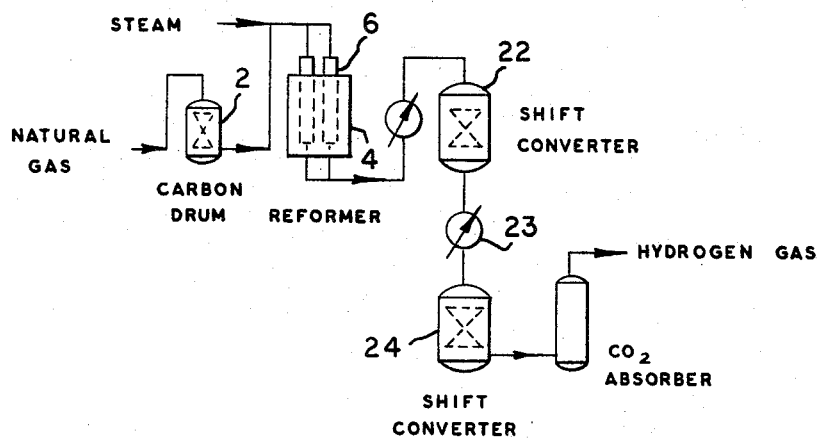
FIG. 2 is a similar flow diagram modified by the invention.

Another aspect of this invention is illustrated in FIG. 2. The desulfurizer 2, and reformer 4 are as described. However, two low temperature shift conversion stages 22 and 24 with only cooling 23 therebetween are shown. This is a more efficient process than that of FIG. 1. The gas stream from the carbon dioxide absorber is, of course, methanated in the usual manner.

The savings afforded by this invention are perhaps best illustrated by typical examples of hydrogen plants described to produce hydrogen having a purity of 94.79 percent hydrogen delivered at a pressure of 300 p.s.i.g. The remaining components are 4.97 percent methane with 0.24 percent nitrogen. The reformer contains a conventional reforming catalyst in processes A and B. This commercial reforming catalyst has the following composition:

| Ingredient: | Weight percent |
|---|---|
| Nickel oxide | 34 |
| Calcium aluminate cement | 66 |
|  | 100 |

In operation A the shift catalyst is also conventional, being of the following:

| Ingredient: | Weight percent |
|---|---|
| $Fe_2O_3$ | 79 |
| $Cr_2O_3$ | 10 |
| Graphite | 3 |
| Water | 8 |
|  | 100 |

In operation B a low temperature copper-zinc catalyst is employed in conjunction with the same conventional reforming catalyst employed in operation A. The low temperature shift catalyst is prepared according to Example 1 of U.S. 3,303,001.

TABLE a

| Operation and Description of Catalyst | A Conventional Catalyst in Both Reformer and Shift | B Conventional Catalyst in Reformer and Low Temperature Shift Catalyst |
|---|---|---|
| Product 95% $H_2$, MM s.c.f.d. | 60 | 60 |
| Feed Gas to Reformer, s.c.f.h. | 670,159 | 670,159 |
| Steam to Peformer, lbs./hr. | 267,000 | 203,000 |
| Reformer Outlet: | | |
| Temperature, °F. | 1,450 | 1,450 |
| Pressure, p.s.i.g. | 300 | 300 |
| Dry Gas Volume, s.c.f.h. | 3,268,098 | 3,077,303 |
| Steam to Gas | 1.3552 | 1.0433 |
| Composition, Mol Percent: | | |
| $CO_2$ | 14.36 | 13.14 |
| $CO$ | 7.35 | 8.55 |
| $H_2$ | 75.63 | 74.13 |
| $CH_4$ | 2.46 | 3.97 |
| $N_2$ | 0.20 | 0.21 |
|  | 100.00 | 100.00 |
| Steam or Water Added to Reformer Effluent for Shift Reaction | None | None |
| Inlet Temperature to Shift, °F. | 703 | 380 |
| Outlet Temperature from Shift, °F. | 750 | 460 |
| Outlet Gas Volume, s.c.f.h. | 3,462,550 | 3,332,104 |
| Outlet S./G. Ratio | 1.223 | 0.887 |
| Outlet Composition, Mol Percent: | | |
| $CO_2$ | 19.17 | 19.78 |
| $CO$ | 1.32 | 0.25 |
| $H_2$ | 77.00 | 76.11 |
| $N_2$ | 0.19 | 0.19 |
| $CH_4$ | 2.32 | 3.67 |
|  | 100.00 | 100.00 |
| Volume Dry Gas After $CO_2$ Removal to Methanator, s.c.f.h. | 2,804,64 | 2,673,919 |
| Volume Product Gas After Methanator, s.c.f.h. | 2,644,607 | 2,644,607 |
| Product Analyses: | | |
| Percent $H_2$ | 94.79 | 94.79 |
| Percent $N_2$ | 0.24 | 0.24 |
| Percent $CH_4$ | 4.97 | 4.97 |
| Reformer Tube Size, inch i.d. | 4 | 4 |
| Reformer Tube Length, ft. | 32 | 32 |
| No. of Tubes Required | 476 | 373 |

The foregoing table shows that by process B 373 tubes are employed whereas 476 tubes are used in the reformer of process A. The size and cost of a reformer furnace, the largest expenditure in a hydrogen plant, is determined by the number of tubes. A savings of 103 tubes is substantial indeed. In addition there is a savings of 64,000 pounds of water per hour, greatly reducing the operating cost. Referring to the table it can be seen that in process B over one percent more CO and one and one-half percent more methane pass through the reformer. The product after methanation, however, contains 94.79 hydrogen (4.97 methane) in both instances. Thus according to the invention methane leakage from the reformer is related to carbon monoxide conversion in the shift process.

In one of its aspects this invention involves the use of a special reforming catalyst in combination with the low temperature shift conversion stage. This reforming catalyst is described in U.S. 3,359,215 issued Dec. 19, 1967, the reforming catalyst being definitely shaped particles of a nickel impregnated hydraulic cement refractory base in the form of Raschig rings 3/8 inch in height and 5/8 inch in diameter with a 1/4 inch hole through the center, the amount of nickel as metal being 15 to 30 weight percent, 1 to 10 percent of the nickel being coated on the catalyst subsequent to calcination. The use of this catalyst is illustrated in the following tables.

The catalysts in the process of Table b are the conventional nickel reforming catalyst and the conventional iron-chrome shift catalyst.

TABLE b

Reformer operating conditions

| | |
|---|---|
| Steam/carbon ratio in the feed | 7.35 |
| Steam/gas ratio in the reformer exit | 1.37 |
| Inlet gas temperature °F | 700 |
| Exit gas temperature °F | 1450 |
| Exit dry gas composition from the reformer: | |
| $CH_4$ percent | 2.07 |
| CO do | 7.23 |
| $CO_2$ do | 14.07 |
| $H_2$ do | 76.27 |
| $N_2$ do | 0.36 |

Reformer furnace design conditions

| | |
|---|---|
| Tube diameter inches | 3 |
| Length of tube in fired zone feet | 30 |
| Heat transfer, B.t.u./ft.$^2$/hr. | 11,378 |
| Number of tubes | 438 |
| Cubic feet of catalyst loaded | 688 |

Shift converter operating conditions

| | |
|---|---|
| Inlet gas temperature °F | 704 |
| Exit gas temperature °F | 750 |
| Quantity of catalyst in shift converter | [1] 1008 |
| Inlet gas composition to shift converter: | |
| $CH_4$ percent | 2.07 |
| CO do | 7.23 |
| $CO_2$ do | 14.07 |
| $H_2$ do | 76.27 |
| $N_2$ do | 0.36 |
| Exit dry gas composition from the shift converter: | |
| $CH_4$ percent | 1.95 |
| CO do | 1.31 |
| $CO_2$ do | 18.80 |
| $H_2$ do | 77.60 |
| $N_2$ do | 0.34 |

[1] Cubic feet of ¼″ tablets.

Methanator operating conditions

| | |
|---|---|
| Inlet gas temperature °F | 500 |
| Exit gas temperature °F | 730 |
| Quantity of catalyst in methanator | [1] 337 |
| Inlet gas composition to methanator: | |
| $CH_4$ percent | 2.54 |
| CO do | 1.61 |
| $CO_2$ do | 0.20 |
| $H_2$ do | 95.23 |
| $N_2$ do | 0.42 |
| Exit gas composition from methanator: | |
| $CH_4$ percent | 4.49 |
| $CO+CO_2$ p.p.m | <10 |
| $H_2$ percent | 95.09 |
| $N_2$ do | 0.42 |

[1] Cubic feet of ¼″ tablets.

The number of tubes in the furnace employed in the process outlined in Table b is 438. Now, the following table shows the number of tubes and other conditions resulting from the use of the catalyst of Example 1 of U.S. 3,359,215, and the low temperature shift catalyst of Example 1 of U.S. 3,303,001.

TABLE c

Reformer operating conditions

| | |
|---|---|
| Steam/carbon ratio in the feed | 5.50 |
| Steam/gas ratio in the reformer exit | 1.02 |
| Inlet gas temperature °F | 700 |
| Exit gas temperature °F | 1475 |
| Pressure exit the reformer p.s.i.g | 275 |
| Exit dry gas composition from the reformer: | |
| $CH_4$ percent | 3.22 |
| CO do | 8.93 |
| $CO_2$ do | 12.49 |
| $H_2$ do | 74.98 |
| $N_2$ do | 0.38 |

Reformer furnace design conditions

| | |
|---|---|
| Tube diameter inches | 3 |
| Length of tube in fired zone feet | 30 |
| Heat transfer, B.t.u./ft.$^2$/hr. | 20,085 |
| Number of tubes | 224 |
| Cubic feet of catalyst loaded | 352 |

Shift converter operating conditions

| | |
|---|---|
| Inlet gas temperature °F | 475 |
| Exit gas temperature °F | 510 |
| Quantity of catalyst in shift converter | [1] 821 |
| Inlet gas composition to shift converter: Same as that exit the reformer. | |
| Exit dry gas composition from the shift converter: | |
| $CH_4$ percent | 2.97 |
| CO do | 0.40 |
| $CO_2$ do | 19.40 |
| $H_2$ do | 76.88 |
| $N_2$ do | 0.35 |

[1] Cubic feet of ¼″ tablets.

Methanator operating conditions

| | |
|---|---|
| Inlet gas temperature °F | 500 |
| Exit gas temperature °F | 730 |
| Quantity of catalyst in methanator | [1] 337 |
| Exit gas composition from methanator: | |
| $CH_4$ percent | 4.49 |
| $CO+CO_2$ p.p.m | <10 |
| $H_2$ percent | 95.09 |
| $N_2$ do | 0.42 |

[1] Cubic feet of ¼″ tablets.

It can be observed from comparing the above two cases that the reformer furnace, which is the largest cost in a plant of this type, has been reduced in size by almost one-half. This can be accomplished by taking advantage of the characteristics of both catalysts and utilizing the principles of this invention. In addition the steam requirement has been reduced from a steam to gas ratio of 7.35 to 5.50 which is a reduction of 25 percent in steam resulting in a very substantial savings in operating costs. It is understood that various combinations are possible so long as the low temperature shift catalyst is employed. Thus in addition to two low temperature shift stages, a first high temperature shift stage at 22, FIG. 2 can be employed followed by cooling at 23 and a low temperature shift stage at 24. Thus through the use of a conventional high temperature shift stage followed by a low temperature shift conversion the carbon monoxide value can be reduced from 7 to 14 percent to less than 0.5 percent, again permitting an augmentation of the methane value in the reformer outlet stream, and attendant lessening of reformer conditions to allow a reduction in steam, reformer tubes, fuel, water, etc. Obviously modifications in the invention will be apparent to one skilled in the art. Such variations are deemed to be within the scope of this invention.

What is claimed is:

1. In a process for the production of hydrogen wherein a desulfurized hydrocarbon vapor is reformed to produce a reformer effluent stream containing primarily hydrogen, but also methane, carbon monoxide, carbon dioxide and nitrogen, wherein the reformer effluent stream is shifted to reduce its carbon monoxide content, and wherein the stream is then passed through carbon dioxide scrubbing and methanation zones, the improvement comprising (a) minimizing the carbon monoxide content of the shifted effluent and (b) augmenting the methane content of the reformer effluent, parameters (a) and (b) being so related that the total methane in the methanated product stream is two to ten percent, this relation resulting in a reduction of one of steam, reformer tubes and fuel, (a) being effected by conducting the shift conversion using a low temperature shift catalyst and equilibrium conditions at a temperature of 400° F. to 500° F., and a steam-gas ratio of 0.4:1 to 2:1, which reduced the carbon monoxide to less than one percent, (b) being accomplished by reacting methane and steam using a nickel reforming catalyst, a temperature in the range of 1200° F. to 1500° F. and a steam gas ratio of 2:1 to 5:1, the low temperature shift conversion catalyst being a reduced copper oxide-zinc oxide catalyst containing zinc and copper in a ratio, based on metal, of two to one and less than 0.2 weight percent sodium.

2. The process of claim 1 wherein the low temperature shift catalyst is a reduced copper oxide-zinc oxide catalyst prepared by coprecipitating copper and zinc as their carbonates from an aqueous solution of a mixture of their soluble salts by double decomposition, said mixture being such that the ratio of zinc to copper, based on metal, is 2 to 1, washing the precipitate to remove sodium salts therefrom, continuing said removal until the amount of sodium in said precipitate, calculated from sodium oxide after calcining to the oxide, is less than 0.2 percent, and calcining the sodium carbonate-containing copper and zinc carbonate precipitate to form the oxides.

3. In a process for the production of hydrogen wherein a desulfurized hydrocarbon vapor is reformed to produce a reformer effluent stream containing primarily hydrogen, but also methane, carbon monoxide, carbon dioxide and nitrogen, wherein the reformer effluent stream is shifted to reduce its carbon monoxide content, and wherein the stream is then passed through carbon dioxide scrubbing and methanation zones, the improvement comprising (a) minimizing the carbon monoxide content of the shifted effluent and (b) correspondingly augmenting the methane content of the reformer effluent, parameters (a) and (b) being so related that the total methane in the methanated product stream is two to ten percent, this relation resulting in a reduction of one of steam, reformer tubes and fuel, (a) being effected by conducting the shift conversion using a low temperature shift catalyst and equilibrium conditions at a temperature of 400° F. to 500° F., and a steam-gas ratio of 0.4:1 to 2:1, which reduces the carbon monoxide to less than one per cent, (b) being accomplished by reacting methane and steam using a nickel reforming catalyst, a temperature in the range of 1200° F. to 1500° F. and a steam gas ratio of 2:1 to 5:1, the reforming catalyst being definitely shaped particles of a nickel impregnated hydraulic cement refractory base in the form of Raschig rings 3/8 inch in height and 5/6 inch in diameter with a 1/4 inch hole through the center, the amount of nickel as metal being 15 to 30 weight per cent, 1 to 10 percent being coated on the catalyst subsequent to calcination, the shift conversion catalyst being a reduced copper oxide-zinc oxide catalyst containing zinc and copper in a ratio, based on metal, of two to one and less than 0.2 percent sodium.

References Cited

UNITED STATES PATENTS

| | | | |
|---|---|---|---|
| 417,068 | 12/1889 | Mond et al. | 23—213 |
| 1,128,804 | 2/1915 | Mittasch et al. | 23—213 |
| 1,809,978 | 6/1931 | Larson | 23—213 |
| 1,834,115 | 12/1931 | Williams | 23—213 |
| 2,487,981 | 11/1949 | Reed | 23—213 |
| 2,960,388 | 11/1960 | Johnson et al. | 23—213 |
| 3,074,783 | 1/1963 | Paull | 23—213 XR |
| 3,251,652 | 5/1966 | Pfefferle | 23—213 |
| 3,297,408 | 1/1967 | Marshall | 23—213 |
| 3,303,001 | 2/1967 | Dienes | 23—213 |

FOREIGN PATENTS 961,860  6/1964  Great Britain.

OSCAR R. VERTIZ, *Primary Examiner.*

E. STERN, *Assistant Examiner.*